(12) United States Patent
Busse et al.

(10) Patent No.: US 8,276,059 B2
(45) Date of Patent: Sep. 25, 2012

(54) DISPLAYING DETAILED INFORMATION IN THE CONTEXT OF A CONDENSED ENUMERATION OF INFORMATION

(75) Inventors: Daniela K. Busse, Palo Alto, CA (US); Ramshankar Venkatasubramanian, Santa Clara, CA (US); Kevin Wang, Shanghai (CN)

(73) Assignee: SAP AG, Walldorf (DE)

( * ) Notice: Subject to any disclaimer, the term of this patent is extended or adjusted under 35 U.S.C. 154(b) by 723 days.

(21) Appl. No.: 11/694,020

(22) Filed: Mar. 30, 2007

(65) Prior Publication Data
US 2008/0244379 A1    Oct. 2, 2008

(51) Int. Cl.
G06F 17/00 (2006.01)
G06F 3/048 (2006.01)
(52) U.S. Cl. .................. 715/227; 715/212; 715/777
(58) Field of Classification Search .............. 715/227, 715/764, 212, 777
See application file for complete search history.

(56) References Cited

U.S. PATENT DOCUMENTS

| | | | |
|---|---|---|---|
| 5,317,686 A | 5/1994 | Salas et al. | |
| 5,339,392 A | 8/1994 | Risberg et al. | |
| 5,572,644 A | 11/1996 | Liaw et al. | |
| 5,701,400 A | 12/1997 | Amado | |
| 5,712,020 A | 1/1998 | Parker | |
| 5,768,158 A | 6/1998 | Adler et al. | |
| 5,787,001 A | 7/1998 | Dietrich, Jr. et al. | |
| 5,842,180 A | 11/1998 | Khanna et al. | |
| 5,890,174 A | 3/1999 | Khanna et al. | |
| 6,738,770 B2 | 5/2004 | Gorman | |
| 7,415,677 B2* | 8/2008 | Arend et al. | 715/804 |
| 2002/0046245 A1* | 4/2002 | Hillar et al. | 709/205 |
| 2003/0227489 A1* | 12/2003 | Arend et al. | 345/804 |
| 2005/0015379 A1 | 1/2005 | Aureglia et al. | |
| 2005/0081141 A1* | 4/2005 | Jonsson | 715/503 |
| 2006/0031849 A1 | 2/2006 | Barat et al. | |
| 2007/0130502 A1* | 6/2007 | Tolgu et al. | 715/503 |

OTHER PUBLICATIONS

SAP AG. "SAP Solution Brief SAP NetWeaver Create Applications Easily With Visual Composer Tool," available at http://www.sap.com/usa/platform/netweaver/pdf/BWP_SB_Creating_Applications_Easily_with_Visual_Composer_Tool.pdf (2006).
SAP AG. "SAP NetWeaver Visual Composer: User Guide, SAP NetWeaver Visual Composer release 6.0, Document version 1.1" SAG AG (2004).
U.S. Appl. No. 11/681,625, filed Dec. 29, 2006.
U.S. Appl. No. 11/694,048, filed Mar. 30, 2007.

* cited by examiner

Primary Examiner — Daeho Song
(74) Attorney, Agent, or Firm — Fish & Richardson P.C.

(57) ABSTRACT

Systems and techniques for displaying detailed information in the context of a condensed enumeration of information. For example, in one aspect, in one aspect, a display includes a visual rendition of a table that systematically arranges condensed information in a collection of rows and columns for reference by a human user. The table includes information characterizing a collection of items. The visual rendition of the table comprises a region that renders additional detail regarding a first item in the collection. The region is disposed in the midst of the visual rendition of the table.

21 Claims, 9 Drawing Sheets

| ENTITY ID | RELATIONSHIP INFO A | RELATIONSHIP INFO ... | RELATIONSHIP INFO N |
|---|---|---|---|
| Entity_1 | Info_A_1 | ... | Info_N_1 |
| Entity_2 | Info_A_2 | ... | Info_N_2 |
| Entity_3 | Info_A_3 | ... | Info_N_3 |
| ... | ... | ... | ... |
| Entity_N | Info_A_N | ... | Info_N_N |

| Opportunity | Prospect | Phase | Exp. Sales Volume | Currency | Close Date ≜ | Velocity |
|---|---|---|---|---|---|---|
| ▸ AllyCAD 4.0 | ABC Corp | 1. Qualify | 76,449 | USD | 2005-10-15 | New |

- ⊞ Activities
- ▨ Contacts
- ▨ Sales Team
- ▨ Competitors
- ⬛ Attachments
- 🗒 Change Log

Doug Balterra
Sales Assistant
6398 E. Corson Wy
San Francisco, CA 94114

Business: (415) 621-0000
Mobile: (415) 621-0110
Email: doug.balterra@sap.com

Jane Johnson
Sales Manager
5497 SW Barton St
San Francisco, CA 94114

Business: (415) 650-0515
Mobile: (415) 700-1597
Email: jane.johnson@sap.com

[All Contact Info]

| ▸ SuperCAD 3.5 | ABC Corp | 2. Proposal | 37,606 | USD | 2005-10-15 | New |
| ▸ AllyCAD 4.0 | ABC Corp | 3. RFP | 49,821 | USD | 2005-11-15 | OK |
| ▸ SuperCAD 3.5 | ABC Corp | 4. Demo | 40,793 | USD | 2005-11-15 | OK |

FIG. 11

| ▶ | AllyCAD 4.0 | | ABC Corp | | 1. Qualify | | 76,449 | USD | 2005-10-15 | New |

| | 915 | Activities | |
| | 920 | Contacts | |
| | 925 | Sales Team | |
| | 930 | Competitors | |
| | 935 | Attachments | |
| | 940 | Change Log | |

Adobe
345 Park Avenue
San Jose, CA 95110

Type: Graphics
Website: www.adobe.com
Lost to: ☐ — 1105

Autodesk
111 McInnis Parkway
San Rafael, CA 94903

Type: Graphics
Website: www.autodesk.com
Lost to: ☑ — 1105

AcroPlot
71 Silton Road, Suite #9
Woodbridge, Ontario Canada, L4L 7Z8

Type: Graphics
Website: www.cadopolis.com
Lost to: ☐ — 1105

| ▶ | SuperCAD 3.5 | ABC Corp | 2. Proposal | 37,606 | USD | 2005-10-15 | New |
| ▶ | AllyCAD 4.0 | ABC Corp | 3. RFP | 49,821 | USD | 2005-11-15 | OK |
| ▶ | SuperCAD 3.5 | ABC Corp | 4. Demo | 40,793 | USD | 2005-11-15 | OK |

FIG. 12

DISPLAYING DETAILED INFORMATION IN THE CONTEXT OF A CONDENSED ENUMERATION OF INFORMATION

TECHNICAL FIELD

This disclosure relates to displaying detailed information in the context of a condensed enumeration of information.

BACKGROUND

The information that is available to data processing activities performed in accordance with the logic of a set of machine-readable instructions is often condensed for display to a human user. For example, a collection of information can be condensed for display by omitting some of the information in the collection from the display, by summarizing, averaging, or otherwise combining information in the collection, and/or by graphically rendering numerical information.

Often, a condensed enumeration of a collection of information has the advantage of being conveniently amenable for display to human users. However, some of the information in the collection is inevitably unavailable in the condensed enumeration.

A table is one example of visual rendition that can include a condensed enumeration of a collection of information. A table includes rows and columns that systematically arrange information for reference. The information displayed in the rows and columns of a table can be, e.g., a subset of the information in a collection and/or a summary, average, or other combination of the information in a collection.

A list is another example of visual rendition that can include a condensed enumeration of a collection of information. A list is a two-dimensional systematic arrangement of information.

SUMMARY

This disclosure encompasses and describes systems, techniques, and machine-readable instructions for displaying detailed information in the context of a condensed enumeration of information. For example, in one aspect, a display includes a visual rendition of a table that systematically arranges condensed information in a collection of rows and columns for reference by a human user. The table includes information characterizing a collection of items. The visual rendition of the table comprises a region that renders additional detail regarding a first item in the collection. The region is disposed in the midst of the visual rendition of the table.

This and other aspects can include one or more of the following features. The region can be a pop-in window whose display in the midst of the visual rendition is triggered in response to user interaction. The visual rendition of the table can also include widgets associated with the items in the collection by virtue of a disposition of the widgets adjacent to information identifying the items. The widgets can be responsive to interaction with the human user to trigger a display of additional detail regarding their associated items.

The region can include an interactive element to interact with the human user. The interactive element can receive a modification to the additional detail from the human user or the interactive element can receive a selection of a category of the additional detail to be rendered in the region. The items can be entities, the information characterizing the items can characterize relationships involving the entities, and the additional detail can characterize a relationship involving one of the entities. Each row of the table can be associated with an item and the region can be disposed adjacent the row associated with the first item.

In another aspect, a method includes displaying a rendition of a table on an display device in accordance with the logic of a set of machine-readable instructions, receiving a trigger, and in response to the trigger, changing the rendition of the table to provide additional detail describing the item beneath a first row disposed immediately above the selected row and above a second row disposed immediately below the selected row. The table condenses a collection of information for display to a human user. The trigger identifies a selected row in the table that includes information describing an item.

This and other aspects can include one or more of the following features. The trigger can be received as user interaction with a visual element associated with the selected row. The change to the rendition of the table can include deleting the selected row and/or rendering a collection of interactive visual elements in the rendition of the table. User interaction with these interactive visual elements can be received and the additional detail describing the item can be modified based on the user interaction. User interaction with a first of the interactive visual elements can be received and a category of the additional detail in the rendition of the table can be changed based on the user interaction.

In another aspect, an article includes one or more machine-readable media storing instructions operable to cause one or more machines to perform operations. The operations include displaying a condensed enumeration of information on a display screen, receiving information identifying a region of the condensed enumeration associated with a first item, expanding the region of the condensed enumeration associated with the first item, and displaying additional detail regarding the first item in the expanded region.

This and other aspects can include one or more of the following features. The condensed enumeration of information can include a table that includes a collection of rows and columns. The information identifying the region of the table can include user interaction with a widget associated with a first row of the table. A row associated with the first item can be expanded.

The additional detail can be displayed in a pop-in window in the expanded region. The operations can also include displaying a collection of widgets in the expanded region. User interaction with a first of these widgets in the collection can be received and a category of the additional detail displayed in the expanded region based on the user interaction.

Each of the foregoing, as well as other disclosed example methods, may be implemented on a data-processing device. Moreover, some or all of these aspects can be included in systems and software for displaying condensed enumeration of information. The details of one or more implementations are set forth in the accompanying drawings and the description below. Other features and advantages will be apparent from the description and drawings, and from the claims.

DESCRIPTION OF DRAWINGS

FIG. 7 is a schematic representation of an output of relationship information in the context of a condensed enumeration of information.

FIGS. 8-12 are schematic representations of a display of detailed relationship information regarding an entity in the context of a condensed enumeration of information.

Like reference symbols in the various drawings indicate like elements.

DETAILED DESCRIPTION

Figure 1:
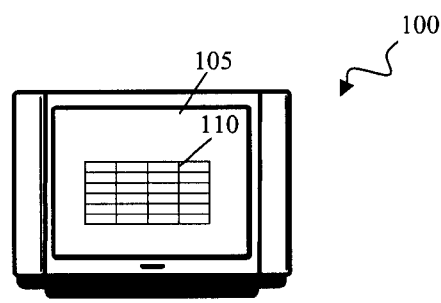
FIG. 1 is a schematic representation of a visual display device that renders a condensed enumeration of information to a human user.

FIG. 1 is a schematic representation of a visual display device 100 that renders a condensed enumeration of information to a human user. In particular, visual display device 100 includes a display 105 that, under the guidance of one or more data processing devices operating in accordance with the logic of a set of machine-readable instructions, outputs a visual rendition of a table 110 to a human user. Table 110 can be a condensed enumeration of information in that information displayed in the rows and columns of table 110 can be, e.g., a subset of the information available to the data processing device and/or a summary, average, or other combination of the information available to the data processing device. Visual display device 100 can be, e.g., a computer monitor, a television screen, a display screen on personal digital assistant, a cell-phone, a music player, or the like.

Figure 2:
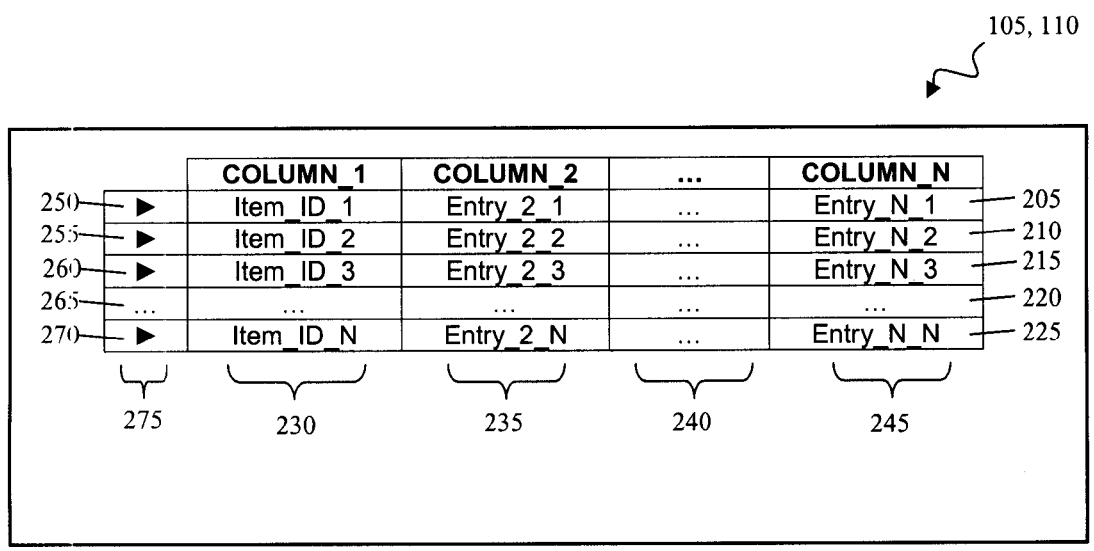
FIG. 2 is a schematic representation of an output of a condensed enumeration of information on a display.

FIG. 2 is a schematic representation of an output of table 110 on display 105. Table 110 includes a collection of rows 205, 210, 215, 220, 225 and columns 230, 235, 240, 245 that systematically arrange a condensed enumeration of information for reference by a human user. Column 230 includes item identifying information (such as item names, identification numbers, or the like) arranged in rows 205, 210, 215, 220, 225. The identifying information in column 230 can identify items such as, e.g., products, individuals, businesses, and/or other entities. Columns 235, 240, 245 includes various entries associated with the items identified in column 230. The entries in each of columns 235, 240, 245 can be values that characterize attributes of items identified in the rows 205, 210, 215, 220, 225 of column 230.

Table 110 also includes a collection of widgets 250, 255, 260, 265, 270 in a column 275. Widgets 250, 255, 260, 265, 270 are visual elements that, in response to user interaction, trigger the display of detailed information regarding items identified in column 230 of the corresponding row 205, 210, 215, 220, 225. In particular, detailed information regarding an item is displayed in the context of the condensed enumeration of information of table 110.

Figure 3:
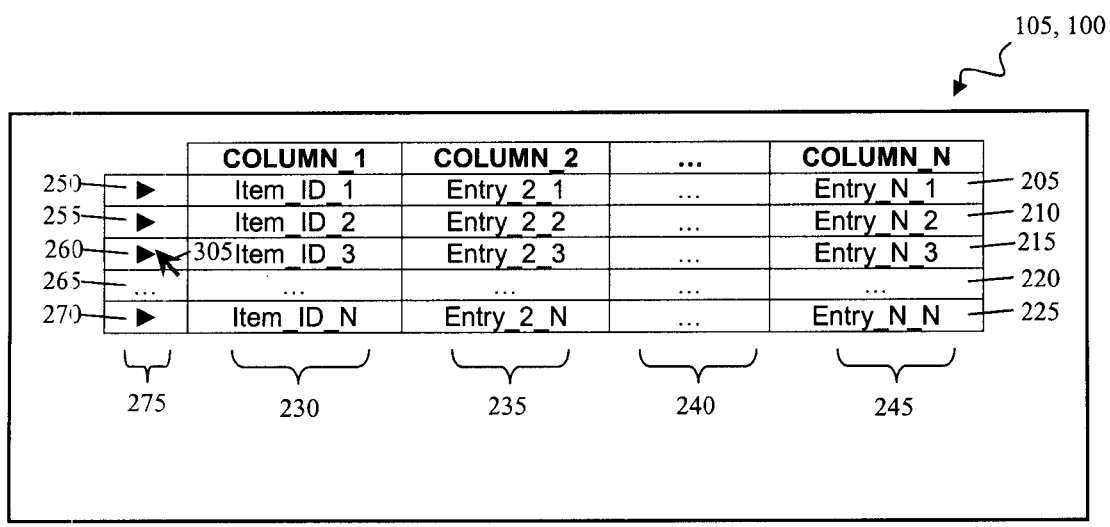
FIG. 3 is a schematic representation of user interaction with a widget that can trigger the display of detailed information regarding an item in the context of a condensed enumeration.

FIG. 3 is a schematic representation of user interaction with a widget that can trigger the display of detailed information regarding an item in the context of the condensed enumeration of information of table 110. In particular, a user can position a visual element such as pointer 305 over widget 260 that is associated with row 215. For example, pointer 305 can be positioned over widget 260 by a user wielding a mouse, a keyboard, a trackball, or other input device.

The display of detailed information regarding the item identified in row 215 of column 230 can be triggered by such a positioning of pointer 305 over widget 260. Alternatively, the display of detailed information can be triggered by additional user interaction, such as a user clicking or double-clicking on widget 260 with pointer 305.

Figure 4:
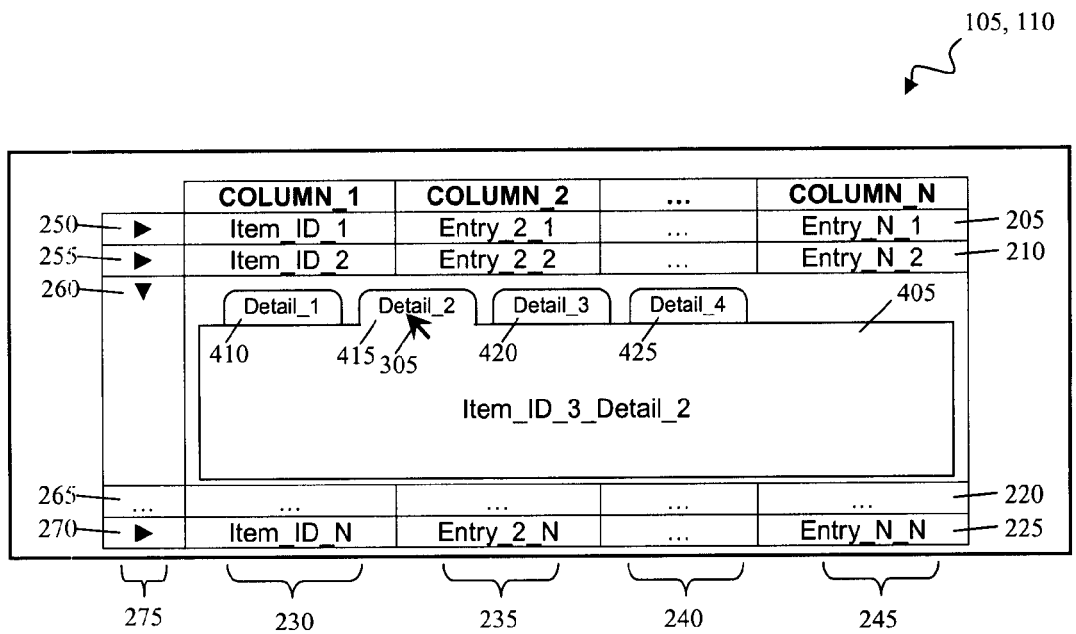
FIG. 4 is a schematic representation of a display of detailed information regarding an item in the context of a condensed enumeration of information.

FIG. 4 is a schematic representation of a display of detailed information regarding an item in the context of the condensed enumeration of information of table 110. In particular, in response to a trigger of the display of detailed information, detailed information regarding the item identified in column 230 of row 215 is displayed in a region 405. Region 405 is in the midst of table 110, e.g., in a "pop-in" window positioned between rows 210, 220. Rows 210, 220, along with other portions of table 110, can remain visible in display 105. In this way, additional detail regarding the item identified in column 230, row 215 can be displayed in the context of the condensed enumeration of other information in table 110.

In some implementations, region 405 can include a collection of widgets 410, 415, 420, 425. Widgets 410, 415, 420, 425 are visual elements that, in response to user interaction, trigger the display of selected classes of detailed information in region 405. For example, widgets 410, 415, 420, 425 can resemble folder tabs that include text or other information describing characteristics of the class of detailed information to be displayed in region 405. A user can navigate to a desired class of detailed information by interacting with a widget 410, 415, 420, 425 that describes a characteristic of that class. For example, a user can position pointer 305 over widget 415 to trigger the display of a selected class of detailed information in region 405, as shown.

With the display of widgets 410, 415, 420, 425 in region 405, a user can trigger the display of a particular class of detailed information regarding the item identified in column 230, row 215 in the context of the condensed enumeration of other information in table 110.

Figure 5:
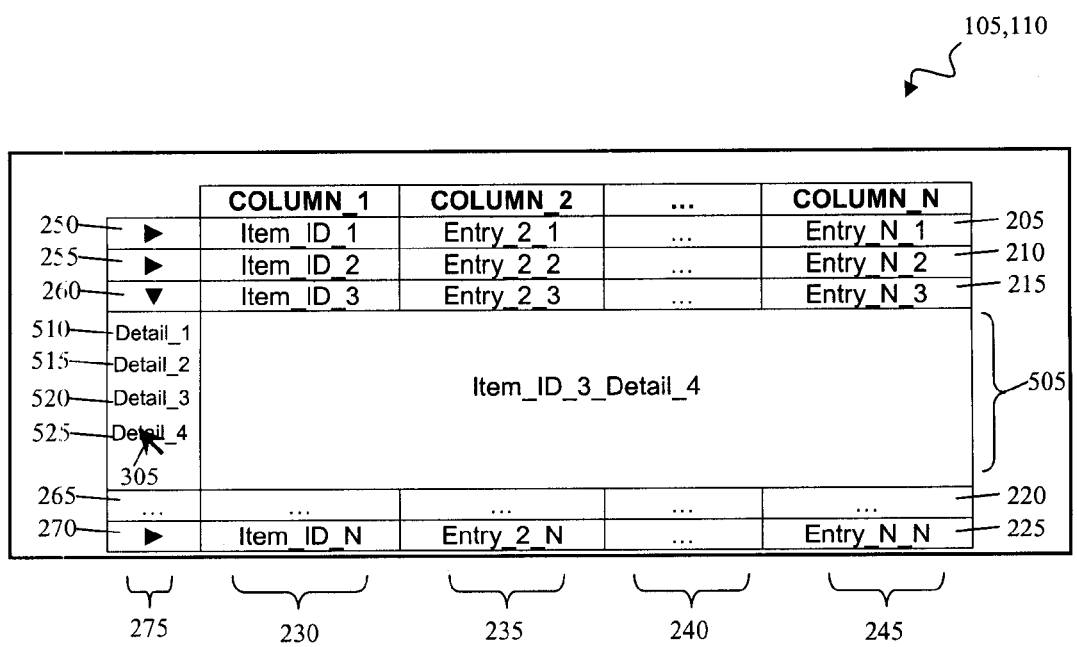
FIG. 5 is a schematic representation of another display of detailed information regarding an item in the context of a condensed enumeration of information.

In the implementation shown in FIG. 4, the identifying information and other entries in row 225 are removed so that the additional detail can be displayed. This is not necessarily the case. For example, FIG. 5 is a schematic representation of another display of detailed information regarding an item in the context of the condensed enumeration of information of table 110. In particular, detailed information regarding the item identified in column 230 of row 215 is displayed in a region 505. Region 505 is in the midst of table 110, e.g., in a "pop-in" window positioned between rows 215, 220. Rows 215, 220, along with other portions of table 110, can remain visible in display 105. In this way, additional detail regarding the item identified in column 230, row 215 can be displayed in the context of the condensed enumeration of other information in table 110.

In some implementations, region 505 can include a collection of widgets 510, 515, 520, 525. Widgets 510, 515, 520, 525 are visual elements that, in response to user interaction, trigger the display of selected classes of detailed information in region 505. For example, widgets 510, 515, 520, 525 can resemble hyperlinks that include text or other information describing characteristics of the class of detailed information to be displayed in region 505. A user can navigate to a desired class of detailed information by interacting with a widget 510, 515, 520, 525 that describes a characteristic of that class. For example, a user can position pointer 305 over widget 525 to trigger the display of a selected class of detailed information in region 505, as shown.

With the display of widgets 510, 515, 520, 525 in region 505, a user can trigger the display of a particular class of detailed information regarding the item identified in column 230, row 215 in the context of the condensed enumeration of other information in table 110.

Figure 6:
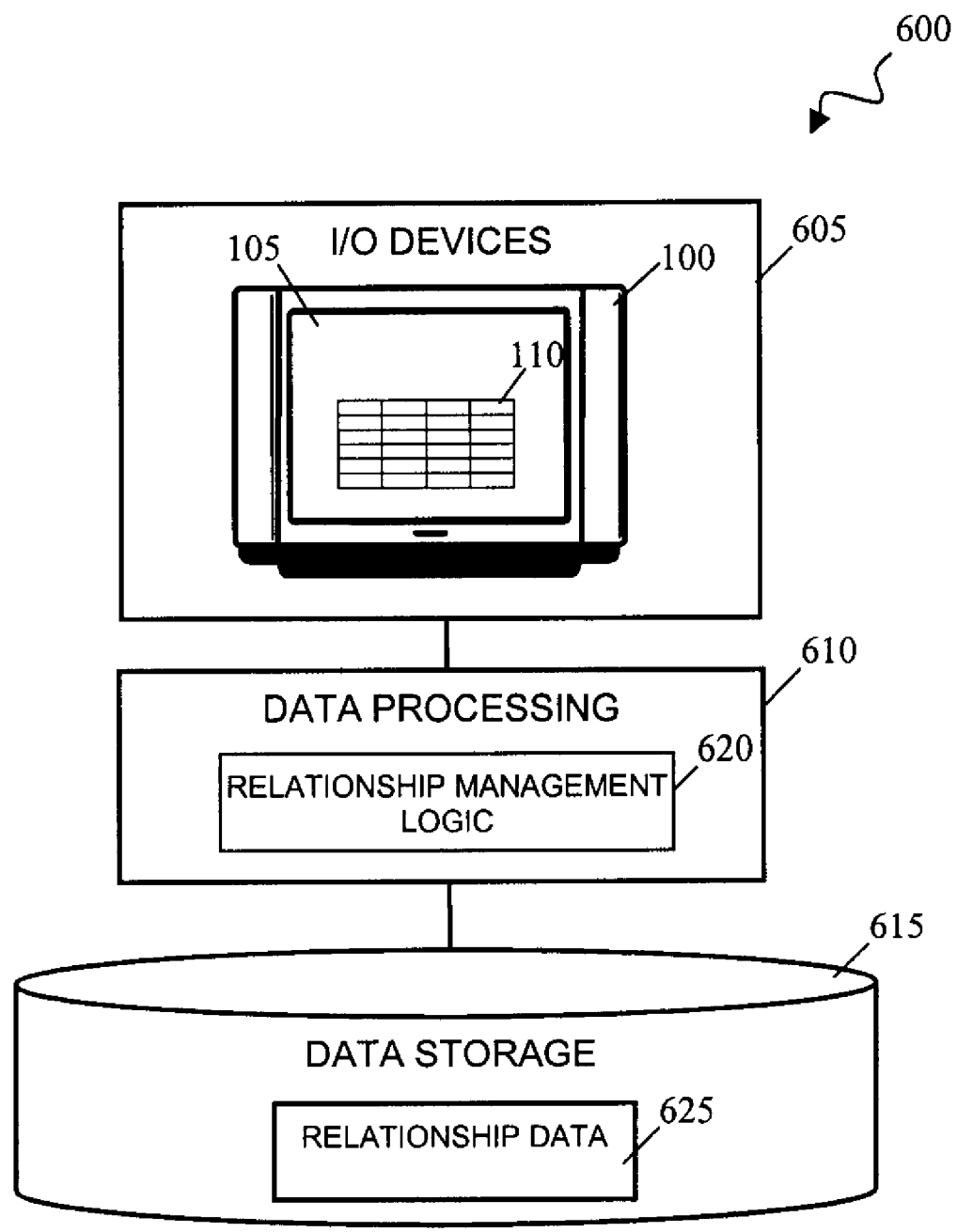
FIG. 6 is a schematic representation of a relationship management system that renders a condensed enumeration of information to a human user.

FIG. 6 is a schematic representation of a relationship management system 600 that includes a visual display device 100 that renders a condensed enumeration of information to a human user. A relationship management system is a collection of one or more data processing devices that manage the relationships of an entity with other entities. Examples of such entities include, e.g., businesses, governmental agencies, non-profit groups, and/or international organizations. The data processing devices in a relationship management system can manage relationships by performing data processing activities in accordance with the logic of one or more sets of machine readable instructions.

The nature of a relationship management system, and the relationships managed using such a system, can reflect the nature of the entities themselves. For example, customer relationship management (CRM) software can be used by companies to manage their relationships with existing and potential customers, including collecting, storing and analyzing customer information. As another example, supplier relationship management (SRM) software can be used by companies to manage their relationships with existing and potential suppliers, including collecting, storing and analyzing supplier information.

Relationship management system 600 includes a collection of one or more I/O devices 605, one or more data processing devices 610, and one or more data storage devices 615. I/O devices 605 include one or more devices for interacting with a user. For example, in addition to visual display device 100, I/O devices 605 can include input and output devices such as a mouse, a keyboard, speakers, microphones, joysticks, or the like. The interactions between I/O devices 605 and a user can be used to direct the display, of detailed information in the context of a condensed enumeration of information. In some implementations, I/O devices 605 can be part of a front end client of a tiered system landscape.

Data processing devices 610 are one or more devices that perform data processing activities in accordance with the logic of one or more sets of data processing instructions. In particular, the data processing devices 610 can perform operations in accordance with relationship management logic 620. For example, in one implementation, data processing devices 610 can form an application layer of a tiered system landscape that performs data processing activities in accordance with the logic of customer relationship management (CRM) software and/or supplier relationship management (SRM) software.

Data storage devices 615 are one or more devices that store relationship information 625 that is accessible by data processing devices 610. Relationship information 625 characterizes the relationships of an entity with other entities. The nature of relationship information 625 can reflect the nature of the entities and their relationships. For example, relationship information 625 can characterize contacts, open orders, closed orders, sales leads, or the like of customers or suppliers of an entity. In one implementation, data storage devices 615 can form a database layer of a tiered system landscape and supply relationship information 625 to an application layer of one or more data processing devices 610.

FIG. 7 is a schematic representation of an output of relationship information in table 110 on display 105. In particular, table 110 includes a collection of rows 705, 710, 715, 720, 725 and columns 730, 735, 740, 745 that systematically arrange a condensed enumeration of relationship information 625 for reference by a human user. Column 730 includes entity identifying information (such as entity names, identification numbers, or the like) arranged in rows 705, 710, 715, 720, 725. The entity identifying information in column 230 can identify entities such as, e.g., companies, individuals, governmental agencies, non-profit groups, international organizations, or the like. Columns 735, 740, 745 includes various relationship information associated with the entities identified in column 730. The relationship information in each of columns 735, 740, 745 can be values that characterize the relationship between an entity and the entities identified in the corresponding row 705, 710, 715, 720, 725 of column 730.

Figure 8:
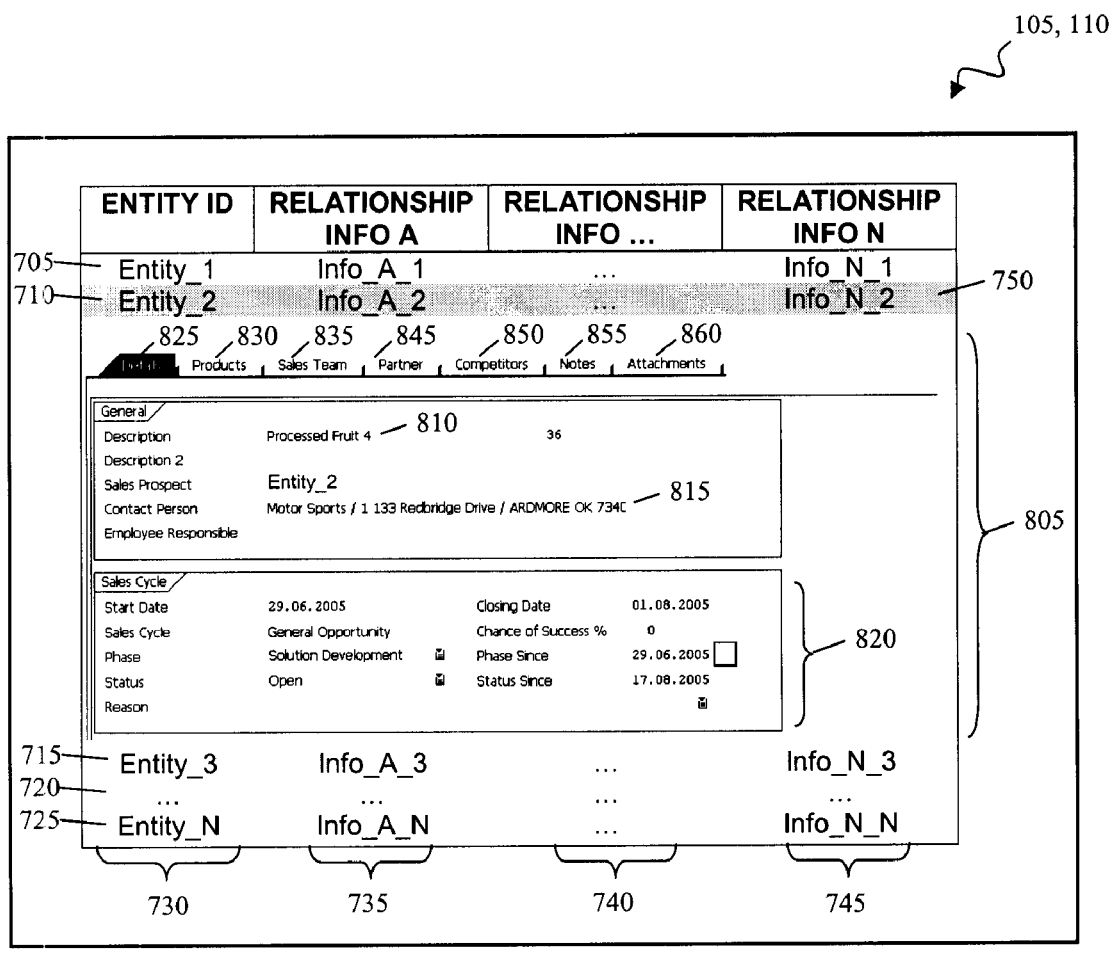

Each of rows 705, 710, 715, 720, 725 acts as an interactive element that, in response to user interaction, triggers the display of detailed relationship information regarding the entities identified in column 730 of that row in the context of the condensed enumeration of information of table 110. For example, a user can position a visual element such as pointer 305 over a row 705, 710, 715, 720, 725 to trigger the display of detailed relationship information regarding an entity in the context of the condensed enumeration of information of table 110. As another example, a user can highlight 750 a row 705, 710, 715, 720, 725 to trigger the display of detailed relationship information regarding an entity, as shown FIG. 8 is a schematic representation of a display of detailed relationship information regarding an entity in the context of the condensed enumeration of information of table 110. In particular, in response to a trigger of the display of detailed relationship information, detailed relationship information regarding the entity identified in column 730 of row 710 is displayed in a region 805 that is in the midst of table 110, e.g., in a "pop-in" window positioned between rows 710, 715.

The detailed relationship information displayed in region 805 identifies that the entity identified in column 730 of row 710 is a "sales prospect" in a transaction identified as "processed fruit 4" at 810. Contact information for the entity identified in column 730 of row 710 is displayed at 815, and additional information regarding the sale for which the entity is a prospect is provided at 820.

In the illustrated implementation, region 805 includes a collection of widgets 825, 830, 835, 840, 845, 850, 855. Widgets 825, 830, 835, 840, 845, 850, 855 trigger the display of selected classes of detailed relationship information in region 805, i.e., in the context of the condensed enumeration of other information in table 110. For example, widget 825 can trigger the display of general detailed relationship information, widget 830 can trigger the display of detailed information regarding products involved in the relationship, widget 835 can trigger the display of detailed information regarding a sales team involved in the relationship, widget 840 can trigger the display of detailed information regarding a partner involved in the relationship, widget 845 can trigger the display of detailed information regarding a competitors for the sales relationship, widget 850 can trigger the display of note regarding the relationship, and widget 855 can trigger the display of attachments regarding the relationship.

Figure 9:
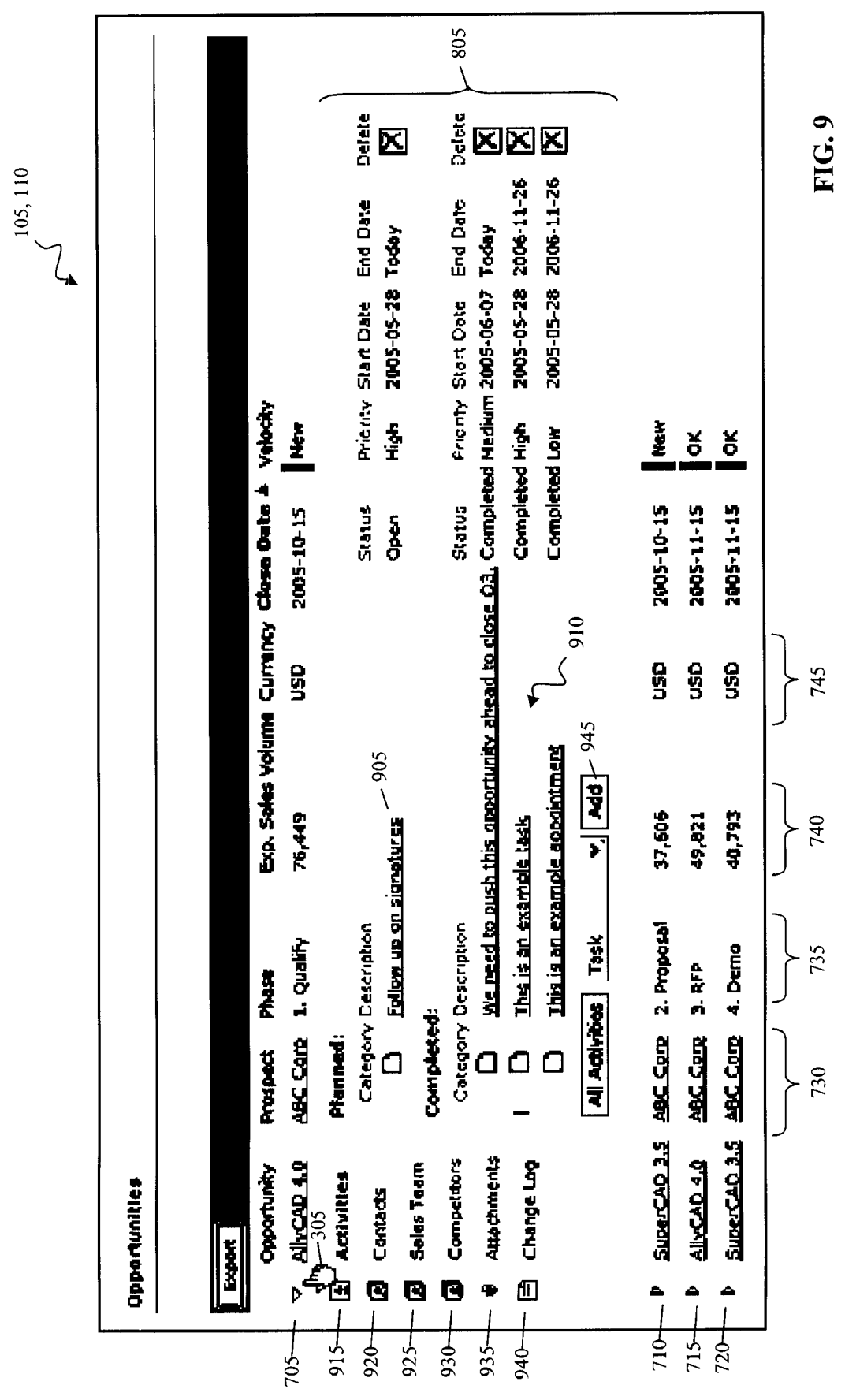

FIG. 9 is a schematic representation of a display of detailed relationship information regarding an entity in the context of the condensed enumeration of information of table 110. In particular, in response to a trigger of the display of detailed relationship information, detailed relationship information regarding a sales opportunity "AllyCAD 4.0" with an entity "ABC Corp." is displayed in a region 805 that is in the midst of table 110, e.g., in a "pop-in" window positioned between rows 705, 710.

The detailed relationship information displayed in region 805 identifies that a follow up on signatures is a planned activity at 905 and that other activities have been completed at 910.

In the illustrated implementation, region 805 includes a collection of widgets 915, 920, 925, 930, 935, 940. Widgets 915, 920, 925, 930, 935, 940 trigger the display of selected classes of detailed relationship information in region 805, i.e., in the context of the condensed enumeration of other information in table 110. For example, widget 915 can trigger the display of detailed information regarding activities involved in the relationship, as shown. As another example, widget 920 can trigger the display of detailed information regarding contacts involved in the relationship.

As yet another example, widget 925 can trigger the display of detailed information regarding a sales team involved in the relationship. FIG. 10 is a schematic representation of a display of detailed sales team information in the context of the condensed enumeration of information of table 110. In particular, region 805 includes information describing the names and contact information regarding a sales opportunity "AllyCAD 4.0" with an entity "ABC Corp."

As yet another example, widget 930 can trigger the display of detailed information regarding a competitors of an entity involved in the relationship. FIG. 11 is a schematic representation of a display of detailed competitor information in the context of the condensed enumeration of information of table 110. In particular, region 805 includes information describing the names and contact information regarding a competitors for the sales opportunity relationship "AllyCAD 4.0" with an entity "ABC Corp."

Figure 12:
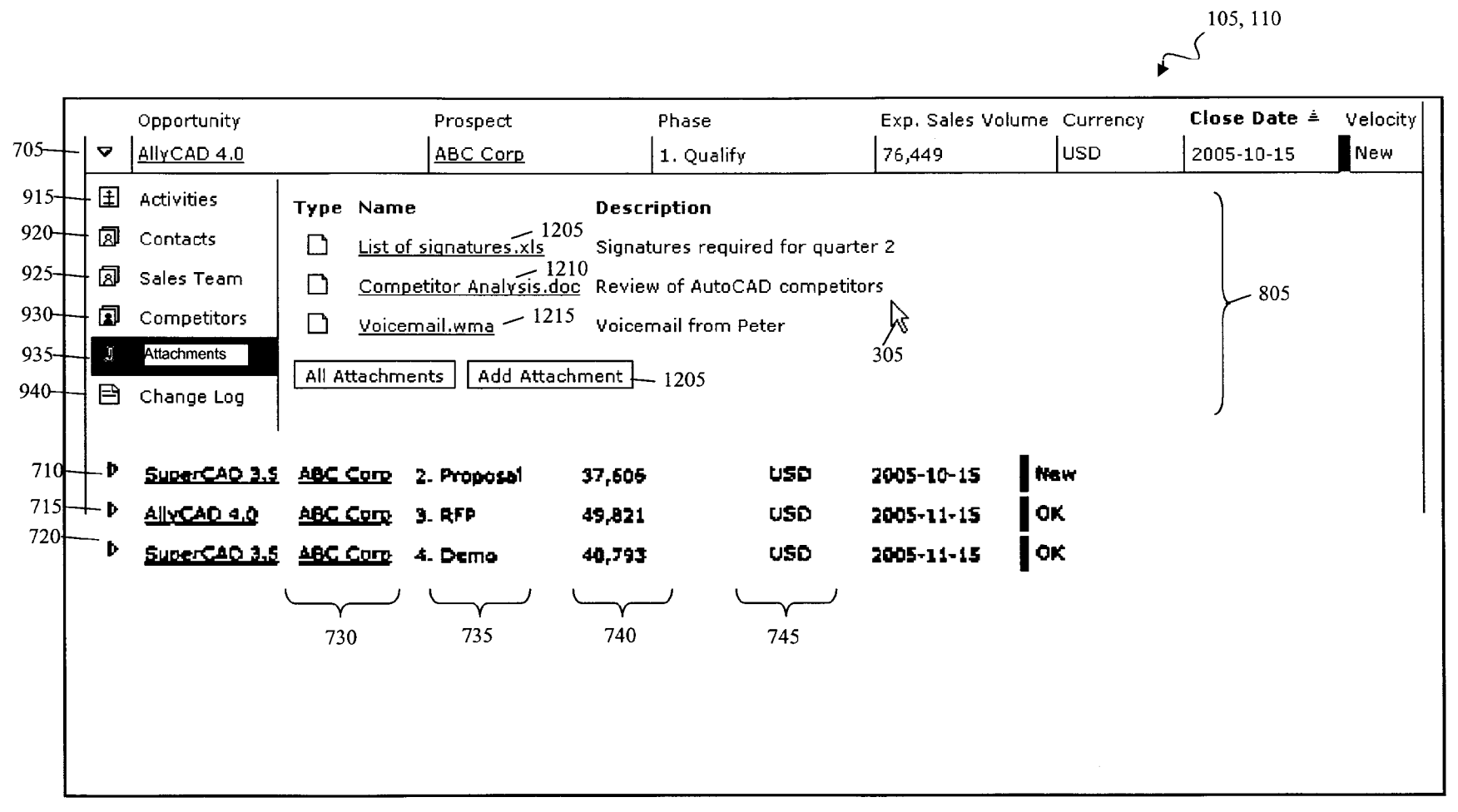

As yet another example, widget 935 can trigger the display of detailed information regarding a attachments associated with a relationship. FIG. 12 is a schematic representation of a display of detailed information describing attachments associated with a relationship the context of the condensed enumeration of information of table 110. In particular, region 805 includes information describing voicemails and documents associated with the sales opportunity "AllyCAD 4.0" with an entity "ABC Corp."

In addition to the relationship information and widgets 915, 920, 925, 930, 935, 940 that trigger the display of selected relationship information, in some implementations region 805 can include a collection of widgets that allow a user to modify relationship information. For example, user interaction with a widget 945 can trigger the addition of activity information to the relationship information of an entity. As another example, user interaction with a widget 1105 can trigger the addition of information to the relationship information of an entity that indicates a sales opportunity has been lost to a competitor. As yet another example, user interaction with a widget 1205 can trigger the addition of an attachment associated with the relationship information.

Moreover, in some implementations region 805 can include one or more widgets trigger the display of even more detailed relationship information. For example, region 805 can include hyperlinks that trigger the display of more detailed relationship information, e.g., in a separate pop-up window. For example, user interaction with a widget 1205, 1210, 1215 can trigger the rendition of an attachment associated with the relationship information.

In some implementations, detailed information can be displayed in the context of the condensed enumerations of information that themselves constitute visual renditions of filtered data. For example, detailed information can be displayed in the context of the condensed enumerations of renditions 905, 1115, 1215 described in U.S. patent application Ser. No. 11/618,625, filed Dec. 29, 2006 and entitled "Filtering Data," the contents of which are incorporated herein by reference.

Display device 100 may be part of an enterprise that includes or is communicably coupled with a server, one or more clients, and a network. The server includes memory and one or more processors and comprises an electronic computing device operable to receive, transmit, process, store, or manage data associated with the system. Generally, this disclosure provides merely one example of computers that may be used with the disclosure. As used in this document, the term "computer" is intended to encompass any suitable processing device. For example, the system can be implemented using computers other than servers, as well as a server pool. Indeed, the server may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. The server may be adapted to execute any operating system including Linux, UNIX, Windows Server, or any other suitable operating system. According to one embodiment, the server may also include or be communicably coupled with a web server and/or a mail server.

Memory may include any memory or database module and may take the form of volatile or non-volatile memory including, without limitation, magnetic media, optical media, random access memory (RAM), read-only memory (ROM), removable media, or any other suitable local or remote memory component. For example, the memory may store classes, frameworks, applications, backup data, jobs, or other information that includes any parameters, variables, algorithms, instructions, rules, or references thereto. The memory may also include any other appropriate data such as VPN applications, firmware logs and policies, firewall policies, a security or access log, print or other reporting files, HTML files or templates, and others.

The server also includes a processor. The processor executes instructions and manipulates data to perform the operations of the server such as, for example, a central processing unit (CPU), a blade, an application specific integrated circuit (ASIC), or a field-programmable gate array (FPGA). Although described as a single processor in the server, multiple processors may be used according to particular needs and reference to processor is meant to include multiple processors where applicable. In certain embodiments, the processor executes a business application, which is any software operable to invoke or execute certain described processes, such as processing and displaying condensed enumeration of information. Regardless of the particular implementation, "software" may include software, firmware, wired or programmed hardware, or any combination thereof as appropriate. Indeed, the business application may be written or described in any appropriate computer language including C, C++, Java, Visual Basic, assembler, Perl, any suitable version of 4GL, as well as others. For example, the business application may be a composite application, where the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. Further, one or more processes associated with the application may be stored, referenced, or executed remotely. For example, a portion of the application may be a web service that is remotely called, while another portion of the application may be an interface object bundled for processing at a remote client. Indeed, a business application may be a hosted solution that allows multiple parties in different portions of the process to perform the respective processing across a network.

The network facilitates wireless or wireline communication between the server and any other local or remote computer, such as the clients. The network may be all or a portion of an enterprise or secured network. In another example, the network may be a virtual private network (VPN) merely between the server and the client across wireline or wireless link. Such an example wireless link may be via 802.11a, 802.11b, 802.11g, 802.20, WiMax, and many others. While described as a single or continuous network, the network may be logically divided into various sub-nets or virtual networks without departing from the scope of this disclosure, so long as at least portion of the network may facilitate communications between the server and at least one the client. In other words, the network encompasses any internal or external network, networks, sub-network, or combination thereof operable to facilitate communications between various computing components in the system. The network may communicate, for example, Internet Protocol (IP) packets, Frame Relay frames, Asynchronous Transfer Mode (ATM) cells, voice, video, data, and other suitable information between network addresses. The network may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments the network may be a secure network associated with the enterprise and certain local or remote clients.

The client is any computing device operable to connect or communicate with the server or the network using a wireless connection. At a high level, each client includes at least the GUI and, in some cases, an agent and comprises an electronic computing device operable to receive, transmit, process and store any appropriate data associated with the backup system. It will be understood that there may be any number of the clients communicably coupled to the server. For example, the clients can include one local client and three external clients to the illustrated portion of the network. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device. For example, the client may be a laptop that includes an input device, such as a keypad, touch screen, mouse, or other device that can accept information, and an output device that conveys information associated with the operation of the server or the clients, including digital data, visual information, or the GUI. Both the input device and output device may include fixed or removable storage media such as a magnetic computer disk, CD-ROM, or other suitable media to both receive input from and provide output to users of the clients through the display, namely the GUI.

The GUI comprises a graphical user interface operable to, for example, allow the user of the client to interface with at least a portion of the system for any suitable purpose such as viewing the condensed enumeration of information. Generally, the GUI provides the particular user with an efficient and user-friendly presentation of data provided by or communicated within the system. The GUI may comprise a plurality of customizable frames or views having interactive fields, pull-down lists, and buttons operated by the user. The GUI is often configurable, supports a combination of tables and graphs (bar, line, pie, status dials, etc.), and is able to build real-time dashboards, where tabs are delineated by key characteristics (e.g., site). The GUI is further operable to generate or request historical reports. Generally, historical reports provide critical information on what has happened including static or canned reports that require no input from the user and dynamic reports that quickly gather run-time information to generate the report. Therefore, the GUI contemplates any graphical user interface, such as a generic web browser, touch screen, or command line interface (CLI) that processes information in the system and efficiently presents the results to the user. The server can accept data from the client via the web browser (e.g., Microsoft Internet Explorer or Netscape Navigator) and return the appropriate HTML or XML responses using the network.

A number of implementations have been described. Nevertheless, it will be understood that various modifications may be made. For example, rather than expanding rows in a table to display detailed information, columns in a table or entries in a list can be expanded to display detailed information. As another example, widgets 250 are shown as triangular elements that rotate in response to such user interaction, but other shapes, sizes, and behavior of widgets 250 are possible. Accordingly, other implementations are within the scope of the following claims.

What is claimed is:

1. An apparatus comprising:
a collection of one or more data storage devices storing information; and
a display device comprising a visual rendition of a table that systematically arranges the information stored at the one or more data storage devices in a collection of rows and columns, wherein the table includes information associated with a collection of items, wherein the visual rendition of the table is configured to replace a row selected by a user with a region configured to render at least one of a plurality of categories of additional detail for a first item included in a user-selected row in the collection of rows, wherein the additional detail is stored at the one or more data storage devices and is available to be rendered in the region, wherein the region is disposed below a first row disposed immediately above the user-selected row prior to the user selection and above a second row disposed immediately below the selected row prior to the user selection, wherein the region includes a plurality of interactive display elements, each configured for selection by a human user and corresponding to a particular category of additional detail in the plurality of categories of additional detail, each interactive display element operable, when selected, to trigger rendering, in the region, of a category of the stored and available additional detail corresponding to the selected interactive display element.

2. The apparatus of claim 1, wherein the region comprises a pop-in window whose display in the midst of the visual rendition is triggered in response to user interaction.

3. The apparatus of claim 1, wherein the visual rendition of the table further comprises widgets associated with the items in the collection by virtue of a disposition of the widgets adjacent to information identifying the items, wherein each widget is responsive to interaction with the human user to select a row corresponding to the item associated with the respective widget and trigger a display of additional detail regarding the item associated with the respective widget.

4. The apparatus of claim 1, wherein the display device further comprises a second interactive element to receive a modification to the additional detail from the human user.

5. The apparatus of claim 1, wherein:
the items comprise entities;
the information characterizing the items characterizes relationships involving the entities; and
the additional detail characterizes a relationship involving one of the entities.

6. The apparatus of claim 1, wherein:
each row of the table is associated with an item and describes at least one attribute of the item.

7. The apparatus of claim 1, wherein the interactive element comprises text identifying the category of the additional detail to be rendered in the region.

8. The apparatus of claim 1, wherein each interactive element in the plurality of interactive elements identifies a different category of additional detail available for presentation in the region.

9. The apparatus of claim 1, wherein each interactive visual element in the plurality of interactive display elements comprises a tab in a tabbed navigation menu, the region at least temporarily masking at least a portion of the user-selected row.

10. A method comprising:
one or more data processing devices displaying a rendition of a table on an display device in accordance with the logic of a set of machine-readable instructions, wherein the table condenses a collection of information stored at one or more data storage devices for display to a human user;
the one or more data processing devices receiving a trigger, the trigger identifying a particular row in the table that includes information describing an item;
in response to the trigger, the one or more data processing devices changing the rendition of the table to provide, based on the collection of information stored at the one or more data storage devices, additional detail describing the item, the additional detail rendered in a region replacing the particular row and beneath a first row disposed immediately above the particular row prior to the trigger and above a second row disposed immediately below the particular row prior to the trigger, wherein changing the rendition of the table comprises rendering a collection of interactive visual elements within the region, each interactive visual elements respectively specifying a different category of additional detail, the additional detail stored at the one or more data storage devices and available to be rendered;
the one or more data processing devices receiving user interaction with a first of the interactive visual elements; and
in response to the user interaction with the first interactive visual element, the one or more data processing devices changing the table to render the stored and available additional detail of the respectively specified category within the region.

11. The method of claim 10, wherein receiving the trigger comprises receiving user interaction with a visual element associated with the selected row.

12. The method of claim 10, wherein changing the rendition of the table comprises temporarily substituting display of the selected row with the region including the collection of interactive visual elements.

13. The method of claim 10, further comprising:
the one or more data processing devices receiving user interaction with second interactive visual elements associated with the additional detail; and
the one or more data processing devices modifying the additional detail based on the user interaction.

14. The method of claim 10, further comprising the one or more data processing devices visually marking the first of the interactive visual elements based on the user interaction therewith.

15. The method of claim 10, wherein the rendering of the collection of interactive visual elements comprises rendering the collection of interactive visual elements in a vertical list beneath the first row and above the second row in the rendition of the table.

16. The method of claim 10, wherein each interactive visual element in the collection of interactive visual elements is rendered as a tab in a tabbed navigation menu.

17. An article comprising one or more tangible machine-readable data storage media storing instructions operable to cause one or more machines to perform operations comprising:
displaying a condensed enumeration of information that is stored at one or more data storage devices on a display screen, the information describing a plurality of items, the condensed enumeration including a plurality of rows, each row in the plurality of rows associated with at least one item in the plurality of items;
receiving information identifying a particular row in the plurality of rows associated with a first item in the plurality of items;
replacing the particular row with an expanded region;
displaying a plurality of widgets in the expanded region, each of the widgets specifying a different category of further detail regarding the first item, wherein the further detail is stored at the one or more data storage devices and available to be rendered;
receiving user interaction with a first of the widgets in the collection, wherein the first widget specifies a first category of the stored and available further detail; and
displaying the stored and available further detail of the first category in the expanded region in response to the user interaction with the first widget.

18. The article of claim 17, wherein displaying the further detail comprises displaying the further detail in a pop-in window in the expanded region.

19. The article of claim 17, wherein displaying the collection of widgets in the expanded region comprises displaying the widgets in a horizontal list in the expanded region.

20. The article of claim 17, wherein each of the widgets comprises graphical identification of the category of the further detail to be rendered in the region.

21. The article of claim 17, wherein each widget in the plurality of widgets comprises a tab in a tabbed navigation menu.

* * * * *